United States Patent [19]

Welsh et al.

[11] 4,209,594

[45] Jun. 24, 1980

[54] THERMOPLASTIC ELASTOMER BLENDS HAVING IMPROVED RESISTANCE TO OIL

[75] Inventors: David Welsh, Monroeville; Ralph Milkovich, Murrysville, both of Pa.

[73] Assignee: Arco Polymers, Inc., Philadelphia, Pa.

[21] Appl. No.: 24,343

[22] Filed: Mar. 27, 1979

[51] Int. Cl.$^2$ .................. C08L 51/00; C08L 53/00
[52] U.S. Cl. .................. 525/71; 260/33.6 AQ; 260/33.6 UA; 525/309; 525/385
[58] Field of Search .................. 525/71, 309, 385

[56] References Cited

U.S. PATENT DOCUMENTS

| | | | |
|---|---|---|---|
| 3,629,387 | 1/1971 | Watanabe et al. | 525/71 X |
| 3,786,116 | 1/1974 | Milkovich et al. | 525/242 X |

*Primary Examiner*—Richard B. Turer
*Attorney, Agent, or Firm*—Lewis J. Young

[57] ABSTRACT

An elastomeric blend having excellent resistance to oil is made from a block copolymer rubber and a graft copolymer made by copolymerizing a macromolecular monomer with one or more alkyl acrylates. The blends are especially useful in shoe sole compositions to impart oil resistance thereto.

4 Claims, No Drawings

THERMOPLASTIC ELASTOMER BLENDS HAVING IMPROVED RESISTANCE TO OIL

BACKGROUND OF THE DISCLOSURE

The preparation of macromolecular monomers, such as polystyrenes having polymerizable end groups, has been described in the prior art. One such prior art is U.S. Pat. No. 3,786,116. This same patent teaches the copolymerization of such macromolecular monomers with other monomers capable of polymerizing therewith to form thermoplastic graft copolymers such as the ones useful in the present invention. The oil resistance of certain such graft copolymers is known from this same patent.

The block copolymer rubbers useful in this invention are also well-known compositions, as described below, and their lack of resistance to oil is also well-known.

SUMMARY OF THE INVENTION

It has now been found that blends of the block copolymer rubbers with certain of the thermoplastic graft copolymers have a resistance to oil which is greater than could be predicted from a calculation based on the percentage compositions of the two ingredients of the blend. The graft copolymers found to be particularly useful, are copolymers prepared by copolymerizing a macromolecular monomer of polystyrene, having molecular weight between 5,000 and 50,000 and terminal methacrylate groups on one end, and one or more alkyl acrylates, having alkyl groups with 1 to 6 carbon atoms.

DETAILED DESCRIPTION OF THE INVENTION

The compositions of the present invention comprise a blend of (a) 5–95% by weight, based on total composition, of a block copolymer rubber and (b) 5–95% by weight, based on total composition, of a thermoplastic graft copolymer.

(a) Diene Block Copolymer Rubbers

The diene block copolymer rubbers suitable for the present invention are block copolymers of vinyl aromatic compounds and conjugated dienes wherein the blocks of conjugated dienes will have average molecular weights greater than the molecular weight of the combined blocks of vinyl aromatic compounds.

These block copolymers will generally be 2–50 percent by weight vinyl aromatic compound and 50–98 percent by weight conjugated diene. More preferrably, the vinyl content will be 10–40 percent with the diene content of 60–90 percent. The vinyl aromatic compounds may be styrene, alpha methylstyrene, nuclear methylstyrenes, ethylstyrene, isopropylstyrene tertbutylstyrene, chlorostyrenes, dichlorostyrenes and vinyl naphthalene and the like. The preferred compound is styrene.

The conjugated diene may be butadiene, isoprene, chloroprene, and piperylene. The preferred dienes are butadiene and isoprene.

Suitable block copolymer rubbers are the graded block, A-B diblock, the radial or star block, A-B-A triblock, and the A-B-A hydrogenated triblock rubbers.

All of the block copolymer rubbers can be made by known processes involving anionic initiators such as butyl lithium.

Graded diblock rubbers are those A-B type block copolymers in which each A block is essentially polymerized vinyl aromatic monomer with a minor amount of a conjugated diene, and each B block is essentially a conjugated diene polymer with a minor amount of vinyl aromatic monomer. Such graded block rubbers may be prepared by polymerizing a mixture of the vinyl aromatic monomer and the diene in a neutral solvent, such as n-hexane, using a sec-butyl lithium catalyst. In this type of system, the initial polymer chains are predominantly polydiene, but as the diene is depleted the later polymer formed is predominantly polyvinyl aromatic monomer. Such copolymer rubbers are also available commercially, as for instance Stereon 720, a Firestone Synthetic Rubber & Latex Co. product having 90 percent by weight butadiene and 10 percent by weight styrene with 55 percent by weight of the styrene appearing as polystyrene blocks.

Diblock copolymer rubbers are copolymers of A-B type wherein A represents a block of poly(vinyl aromatic monomer) and B represents a block of poly(conjugated diene). True diblock copolymer rubbers are made by polymerizing one of the monomers to essential completion and then adding the second monomer. Thus butadiene may be anionically polymerized using sec-butyl lithium catalyst. Then, prior to termination of the polymer chains, the styrene is added and polymerization allowed to continue. Diblock copolymers may also be prepared by separately polymerizing each monomer in the presence of a lithium catalyst and then combining the separate blocks by reacting the lithium terminated blocks together in the presence of a difunctional coupling agent. Such diblock rubbers are also available commercially, as for instance Solprene 1205, a Phillips Petroleum Company product having 75 percent by weight polybutadiene and 25 percent by weight polystyrene.

Radial or star block copolymer rubbers are branched copolymers having at least three A-B diblock chains connected to a central nucleus. Thus, chains of block copolymers prepared by polymerizing vinyl aromatic monomers and conjugated diene monomers in inert solvents using organo-lithium catalysts can be added, while still lithium terminated, to compounds having at least three functional sites capable of reacting with the lithium to carbon bond and adding to the carbon possessing this bond in the copolymer. Such polyfunctional compounds are, for example, polyepoxides, polyisocyanates, polyimines, polyaldehydes, polyketones, polyhalides, polyanhydrides, polyesters, and certain difunctional coupling agents, capable of polymerizing to form polyfunctional nuclei, such as the divinylbenzenes. Such radial block rubbers are also available commercially, as for instance Solprene 406 and Solprene 414 products of Phillips Petroleum Co. having 60 percent by weight polybutadiene and 40 percent by weight polystyrene.

Triblock copolymer rubbers are linear copolymers of the A-B-A or B-A-B type, wherein, again, A represents a block of poly(vinyl aromatic monomer) and B represents a block of poly(conjugated diene). Such triblock copolymers can be prepared by sequential addition of the desired monomers into a lithium alkyl initiated polymerization. Another effective method would be to polymerize the diene monomer, for example, in the presence of a difunctional catalyst, such as dilithiostilbene, and then adding the vinyl aryl monomer to form the end blocks. Such triblock copolymer rubbers are also available commercially as, for example, Kraton 1101, a product of Shell Chemical Co. being a polystyrenepolybutadiene-polystyrene triblock rubber having 70 percent by weight polybutadiene and 30 percent by weight polystyrene.

Also suitable are the hydrogenated triblock copolymer rubbers formed by, for example, selective hydrogenation of A-B-A triblock type copolymers. Especially suitable are the hydrogenated triblock copolymer rubbers wherein the hydrogenation has been primarily in the polydiene blocks, B. Thus, U.S. Pat. No. 3,595,942 describes the polymers and suitable methods for their hydrogenation such that at least 80% of the aliphatic unsaturation has been reduced by hydrogenation and less than 25% of the aromatic unsaturation of the vinyl aromatic monomer blocks, A, have been hydrogenated. Such copolymers are available commercially as, or example, Kraton G, a product of Shell Chemical Co., being a polystyrene-polyisoprene-polystyrene triblock rubber wherein the polyisoprene portion has been hydrogenated to a poly(ethylene/propylene) copolymer block.

(b) Thermoplastic Graft Copolymers

The thermoplastic graft copolymers useful for the present invention are preferrably those prepared by the process taught in U.S. Pat. No. 3,786,116, issued to CPC International, wherein a macromolecular monomer is first prepared, and then the macromolecular monomer is copolymerized with one or more alkyl acrylates where the alkyl groups may contain from 1 to 6 carbon atoms.

The macromolecular monomers of special interest are made by polymerizing styrene with an alkyl lithium initiator to a polystyrene of number average molecular weight between 5,000 and 50,000 and then capping the polystyryl chains with first an alkylene oxide and then a methacrylate group. It is the methacrylate group which copolymerizes with the alkyl acrylates. Although U.S. Pat. No. 3,786,116 teaches that the molecular weight distribution (MWD) of the polystyrene chains prior to copolymerization must be narrow, i.e. less than 1.1 MWD, we have found that in the instant process MWD's of up to 1.45 may be used without harmful effects on the blends. These broader molecular weight distributions are obtained by known variations in temperature of polymerization and the lithium alkyl initiator used.

The alkyl acrylates useful in the invention are those whose alkyl groups contain from 1 to 6 carbon atoms. These include methyl acrylate, ethyl acrylate, propyl acrylate, isopropyl acrylate, the four butyl acrylates, the amyl acrylates, and the hexyl acrylates.

The thermoplastic graft copolymers are prepared by copolymerization of the macromolecular monomer with one or more of the alkyl acrylates by conventional free-radical initiated copolymerization techniques. The preferred copolymers are prepared by copolymerizing 20 to 40 percent by weight, based on graft copolymer, of the macromolecular monomer with 60 to 80 percent by weight, based on graft copolymer, of the one or more alkyl acrylates, as taught in U.S. Pat. No. 3,786,116, the resultant copolymer consists of an acrylate backbone with polystyrene chains grafted to the backbone. The copolymerization proceeds according to known relationships based on the relative reactivities of the monomers as derived from standard copolymerization texts.

The blends of this invention can be prepared by any known means which will provide an essentially homogeneous mixture of the graft polymers and block rubbers. Compounding rolls, mixing extruders, Banbury mixers, plastographs, high intensity mixers, etc. are all suitable for preparing the blends at temperatures suitable to heat plastify the ingredients.

The following examples are given to further illustrate the invention, but are not intended to be all inclusive. All percentages are weight percent unless otherwise indicated.

EXAMPLE I

A. Preparation of Macromolecular Monomer

Cyclohexane (2600 ml), dried by passing through two $1\frac{1}{2}"\times 5'$ columns packed with 4 A molecular sieves, was introduced into a 1-gallon Chemco glass bowl reactor with the temperature controlled at 60° C. by a steam-water mixture passing through an internal coil. Diphenylethylene (0.5 ml) was added to the reactor followed by sufficient quantity (1-3 ml) of sec-butyllithium to produce the yellow color of the lithiated diphenylethylene species indicating that all residual water has been consumed. This yellow solution was then titrated with additional cyclohexane until the yellow color just disappeared. Excess solvent was then drained from the reactor until 2300 cc of dry cyclohexane remained. To this was added 40.2 ml of 1.449 M sec-butyllithium and the solution allowed to stir for 5 minutes. The temperature was lowered to 40° C. and 900 ml (816 gm) of styrene, dried by passing through a $1\frac{1}{2}"\times 5'$ column containing calcium hydride, was added over 20 minutes while maintaining 20 psi nitrogen pressure on the system. The solution developed the deep red color of polystyryllithium almost instantly. After the addition was complete the solution was allowed to stir for 30 minutes at 40° C. To this was added 5 ml of dry ethylene oxide resulting in an immediate change of color from dark red to pale yellow. After stirring for 5 minutes, 7 ml of methacrylyl chloride was added to the reactor causing an immediate disappearance of the pale yellow color. After stirring for 5 minutes the solution was discharged from the reactor. The macromonomer (MM) was precipitated into a 10-fold excess methanol in the Waring Blender, and dried overnight in the vacuum oven. The GPC of the product indicated a molecular weight of 17,000 and molecular weight distribution of 1.05.

B. Preparation of Graft Copolymers of Macromonomers and Acrylates

As suspension system was made by heating 200 g. of water to 65° C., adding 0.2 g. of trisodium phosphate, 0.28 g. of calcium chloride, and 0.2 g. of sodium 2-ethylhexyl sulfate, and stirring the mixture for 5 minutes. A portion (188 ml) of this suspension system was added to a 16-oz. citrate bottle and purged with nitrogen for 15 minutes. A monomer solution was made up by dissolving 30 g. of ethyl acrylate, 30 g. of n-butyl acrylate, 40 g. of the macromolecular monomer from A, above, in 14 g. of benzene and adding 0.15 g. of azobisisobutyronitrile. A portion, 96.12 g. of the monomer solution was added to the citrate bottle containing the suspension system, the bottle capped, placed in a water bath at 70° C. and rotated end-over-end for 8 hours. The bottle was then cooled to room temperature, opened and the polymer recovered by filtration, washed successively with water, dilute hydrochloric acid, and water, and dried in a vacuum oven overnight.

C. Oil Resistance of Blends

Mixtures of the terpolymer prepared in B, above, and a selectively hydrogenated triblock copolymer rubber, Kraton G (a product of Shell Chemical Co.) were blended in a Brabender Plasticorder blender until uniform blending was observed. The blends were then compression molded into 20 mil thick films, cut into 2"×2" squares and accurately weighed. The samples were immersed in Gulfpride Single G motor oil (SAE 30) for 24 hours, removed, and weighed to determine percent oil absorption. The results are shown in Table I.

Table I

| Wt.-% Acrylate Copolymer/ | Absorption of Oil, 24 hrs. | |
|---|---|---|
| Wt.-% Kraton - G | Wt.-% Calcd. | Wt.-% Obsd. |
| 0/100 | 27.7 | 27.7 |
| 25/75 | 20.8 | 14.9 |
| 50/50 | 14.0 | 4.8 |
| 75/25 | 7.1 | 0.9 |
| 100/0 | 0.3 | 0.3 |

The calculated weight percent absorption was calculated assuming a straight line relationship between composition of the blend and the oil absorption of the two pure components. From the table, it is obvious that the absorption of the blends is much less than predicted from the compositions of the blends. Similar effects were noted when the films were immersed in oil for 72 and 168 hours.

EXAMPLE II

A. Using the method of Example IA, the following macromolecular monomers (MM) were prepared:

MM-1 was a polystyrene of number average molecular weight ($M_n$) 14,000, and a molecular weight distribution (MWD) of about 1.05.

MM-2 was a polystyrene of $M_n$ of 13,000 and MWD of about 1.4.

MM-3 was a polystyrene of $M_n$ of 22,000 and MWD of about 1.05.

MM-4 was a polystyrene of $M_n$ of 22,300 and MWD of about 1.43. Note that to prepare monomers with molecular weight distribution greater than 1.1, appropriate changes in temperature and catalyst were made.

B. Using the method of Example IB, the following acrylate copolymers were prepared where compositions are given as weight percents of ethyl acrylate (EA)/butyl acrylate (BA)/macromolecular monomer (MM-):

SA-1 was 0/70/30 EA/BA/MM-2
SA-2 was 0/70/30 EA/BA/MM-1
SA-3 was 0/80/20 EA/BA/MM-3
SA-4 was 0/60/40 EA/BA/MM-4
SA-5 was 35/35/30 EA/BA/MM-3

C. Blends of the acrylate copolymers from B above were made with either Kraton 1101, a Shell Chemical Co. polystyrene-polybutadiene-polystyrene linear triblock rubber having 70% by weight polybutadiene and 30% by weight polystyrene, or Solprene 414, a Phillips Petroleum Co. radial or star block copolymer rubber having 60% by weight polybutadiene and 40% by weight polystyrene. The resistance to oil of the various blends was measured on 20 mil thick compression molded films 2"×2" square, as before, using several different oils. The results for 50/50 weight percent blends of acrylate copolymer/block rubber are shown in Table II.

Table II

| Acrylate Co-polymer | Block Rubber | Oil | Wt.-% Absorption of Oil | |
|---|---|---|---|---|
| | | | 24 hrs. Calcd. | Obsd. |
| SA-1 | Kraton 1101 | SAE-30, Motor | 15.0 | 6.7 |
| SA-2 | Kraton 1101 | Tufflo 6054 (1) | 17.5 | 13.0 |
| SA-2 | Kraton 1101 | NUJOL (2) | 19.5 | 10.0 |
| SA-2 | Kraton 1101 | Sunthene 3125 (3) | 32.5 | 18.0 |
| SA-2 | Kraton 1101 | SAE-30, Motor | 18.0 | 10.0 |
| SA-3 | Kraton 1101 | Sunthene 3125 | 33.8 | 20.1 |
| SA-4 | Kraton 1101 | Sunthene 3125 | 32.0 | 10.7 |
| SA-1 | Solprene 414 | Sunthene 3125 | 30.4 | 14.7 |
| SA-3 | Kraton 1101 | SAE-30, Motor | 21.0 | 10.5 |
| SA-4 | Kraton 1101 | SAE-30, Motor | 20.2 | 7.2 |
| SA-2 | Solprene 414 | SAE-30, Motor | 18.0 | 5.1 |

(1) Tufflo 6054 is a processing oil sold by ARCO Petroleum Products Co.
(2) NUJOL is a mineral oil.
(3) Sunthene 3125 is a high aromatic processing oil sold by Sun Oil Co.

In all cases, the absorption of oil was much less than that predicted from the composition of the blends. Corresponding effects were noted at blends of 25/75 and 75/25 for all acrylate copolymer/block rubber blends.

EXAMPLE III

To illustrate the usefulness of the blends of this invention in shoe sole compositions, several blends were made using the following formulation:

| | Parts By Weight |
|---|---|
| Elastomer (1) | 100 |
| Polystyrene (2) | 146.0 |
| Tufflo 6054 (3) | 162.0 |
| TiO$_2$ | 2.7 |
| Zn Stearate | 65.0 |
| CaCO$_3$ | 65.0 |
| BHT (4) | 0.5 |

(1) The elastomer was a 50/50 blend of an acrylate copolymer and Kraton 1101.
(2) A crystal polystyrene sold by ARCO Polymers, Inc., as Dylene 3D.
(3) A naphthenic processing oil sold by ARCO Petroleum Products Co.
(4) An antioxidant sold by Koppers Company, Inc.

The shoe sole compositions were then compression molded into film and the absorption of Gulfpride Single G motor oil measured as in Example I. The results are shown in Table III.

Table III

| Acrylate Copolymer | Oil Absorption, Wt.-% | | |
|---|---|---|---|
| From Example II | 24 hrs. | 54 hrs. | 120 hrs. |
| SA-4 | 0.7 | 0.9 | 1.0 |
| SA-2 | 0.5 | 0.7 | 0.8 |
| SA-5 | 0.6 | 0.8 | 0.9 |
| 30/30/40 From Ex. I | 0.6 | 0.8 | 0.9 |
| Kraton 1101, 100% | 4.8 | 8.1 | 10.6 |

It can easily be seen that the replacement of only half of the Kraton rubber with the acrylate copolymers gives remarkable resistance to oil, which is a highly desirable property in shoe soles.

We claim:
1. A thermoplastic elastomer composition comprising a blend of:
 a. 5-95% by weight, based on total composition, of a block copolymer rubber of
   A. 2-50% by weight, based on block rubber, of a monovinyl aromatic monomer, and

B. 50–98% by weight, based on block rubber, of a conjugated diene monomer wherein the block copolymer rubber is selected from the group consisting of A-B diblock rubbers, A-B graded diblock rubbers, A-B star or radial block rubbers, A-B-A triblock rubbers, and A-B-A hydrogenated triblock rubbers wherein A represents a monovinyl aromatic monomer block, B represents a conjugated diene monomer block, and the B blocks represent 50–98% by weight of the total block copolymer rubber, and b. 5–95% by weight, based on total composition, of a thermoplastic graft copolymer made by copolymerizing A. 20–40% by weight, based on graft copolymer, of a macromolecular monomer consisting of polystyrene of number average molecular weight between 5,000 and 50,000 terminated with methacrylate groups, and B. 60–80% by weight, based on graft copolymer, of one or more alkyl acrylates wherein said alkyl groups has 1–6 carbon atoms whereby the terminal methacrylate groups of component b.A. are addition copolymerized with the alkyl acrylate of component b.B. to produce a graft copolymer having pendant polystyrene groups.

2. The composition of claim 1 wherein the alkyl acrylate consists of butyl acrylate.

3. The composition of claim 1 wherein the alkyl acrylate consists of ethyl acrylate.

4. The composition of claim 1 wherein the alkyl acrylate consists of a mixture of ethyl acrylate and butyl acrylate.

* * * * *